United States Patent [19]

Roark

[11] Patent Number: 4,661,263

[45] Date of Patent: Apr. 28, 1987

[54] WATER CLARIFICATION

[75] Inventor: David N. Roark, Baton Rouge, La.

[73] Assignee: Ethyl Corporation, Richmond, Va.

[21] Appl. No.: 775,150

[22] Filed: Sep. 12, 1985

Related U.S. Application Data

[63] Continuation-in-part of Ser. No. 702,898, Feb. 19, 1985, abandoned, and a continuation-in-part of Ser. No. 727,077, Apr. 25, 1985, abandoned.

[51] Int. Cl.⁴ .............................................. C02F 1/56
[52] U.S. Cl. .................................................. 210/735
[58] Field of Search ...................... 210/735, 732–734, 210/736; 526/211, 219

[56] References Cited

U.S. PATENT DOCUMENTS

| | | | |
|---|---|---|---|
| 2,456,428 | 12/1948 | Parker | 260/80 |
| 2,662,875 | 12/1953 | Chaney | 260/80.5 |
| 2,795,545 | 6/1957 | Gluesenkamp | |
| 3,062,798 | 11/1962 | Lovett | 260/89.7 |
| 3,210,308 | 10/1965 | Garms et al. | 260/29.2 |
| 3,409,547 | 11/1968 | Dajani | 210/735 |
| 3,673,164 | 6/1972 | Jones et al. | 210/735 X |
| 3,715,336 | 2/1973 | Nowak et al. | 210/54 X |
| 4,018,826 | 4/1977 | Gless, Jr. et al. | 260/583 P |
| 4,021,484 | 5/1977 | Toda et al. | 260/567.6 P |
| 4,053,512 | 10/1977 | Panzer et al. | 210/735 X |
| 4,104,161 | 8/1978 | Wein | 210/735 |
| 4,217,214 | 8/1980 | Dubin | 210/52 |
| 4,329,441 | 5/1982 | Bergthaller | 526/193 |
| 4,504,640 | 3/1985 | Harada et al. | 526/193 |
| 4,528,347 | 7/1985 | Harada et al. | 526/219 |
| 4,540,760 | 9/1985 | Harada et al. | 526/211 |

FOREIGN PATENT DOCUMENTS

| | | |
|---|---|---|
| 95233 | 11/1983 | European Pat. Off. |
| 131306 | 1/1985 | European Pat. Off. |
| 2360610 | 3/1978 | France |
| 84/011453 | 3/1984 | PCT Int'l Appl. |

OTHER PUBLICATIONS

Kajisaki et al., Bull. Govt. Research Inst. Ceram. (Kyoto), vol. 6, pp. 25–28 (1952).
R. C. Laible, Allyl Polymerizations, Chem. Rev., 58 (5), 807–843 (1958).
Chemical Abstracts, vol. 61, 8473h (1964), an abstract of Vittikh et al., Teoriya i Prakt. Ionnogo Obmena, Akad, Nauk Kaz SSR, Tr Resp Soveshch 1962.
C. E. Schildknecht, Allyl Compounds and Their Polymers, Wiley, Interscience Pub., copyright 1973, pp. 29–30 and 523–524.
S. Harada & S. Hasegawa, Macromolecular Chem. Rapid Communications, 5, 27–31 (1984).
Polyallyamine Hydrochloride.

*Primary Examiner*—Tom Wyse
*Attorney, Agent, or Firm*—Donald L. Johnson; John F. Sieberth

[57] ABSTRACT

Water-soluble polymers of monoallylamine are employed to coalesce suspended particulate matter in aqueous dispersions. This enables rapid and efficient separation between coalesced solids and the aqueous medium by any of a variety of conventional physical techniques such as settling and decantation, filtration, centrifugation, and the like.

23 Claims, No Drawings

WATER CLARIFICATION

This application is a continuation-in-part of prior copending applications Ser. No. 702,898, filed Feb. 19, 1985 and a continuation-in-part of Ser. No. 727,077, filed Apr. 25, 1985, both now abandoned.

This invention relates to water purification, and more particularly to methods for removing suspended particulates from aqueous systems such as plant effluents, river water, digestion liquors, coal washings, iron ore tailings, and the like.

This invention involves the discovery, inter alia, that solids can be removed readily and efficiently from aqueous suspensions by admixing with the suspension a water-soluble polymer of monoallylamine—e.g., a water-soluble poly(monoallylamine) or a water-soluble salt of poly(monoallylamine), or both—so that coagulation and/or flocculation of solids is effected. In other words, the polymer of monoallylamine used as the coagulating and/or flocculating agent may be in the form of a free base (i.e., the pendant —$CH_2NH_2$ groups are not neutralized with an acid) or it may be in the form of a plurality or completely neutralized polymer (i.e., some or all of the pendant —$CH_2NH_2$ groups are neutralized with an acid and thus are in salt form). Such salts are also known in the chemical arts as poly(monoallylammonium) salts.

Accordingly, a preferred group of polymers of monoallylamine used pursuant to this invention may be depicted by the general formula:

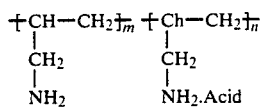

where m is a number from zero to 100,000 or more and n is a number from zero to 100,000 or more, the sum of m plus n being in the range of about 10 to about 100,000 or more. In the formula, Acid represents an organic or inorganic acid complexed with the amino group in the form of a salt. When n is zero or is very small relative to m, the polymer may be deemed for all practical purposes a water-soluble poly(monoallylamine). On the other hand when m is zero or is very small relative to n, the polymer may be deemed for all practical purposes a water-soluble salt of poly(monoallylamine). There is of course no hard and fast dividing line between the two since the transition from one end of the scale to the other is a continuum.

Other preferred polymers of monoallylamine used pursuant to this invention are polymers as above depicted that have been chemically modified during their manufacture by copolymerization with small quantities of suitable polymerizable comonomers containing two or more double bonds in the molecule (e.g., triallylamine hydrochloride and the like) or by crosslinking or bridging with small quantities of a crosslinking agent having two or more groups reactable with the amino group (e.g., epichlorohydrin, ethylene dichloride, and the like). These chemically modified monoallylamine polymers have essentially the same properties and characteristics as the unmodified polymers depicted above except of course those related to molecular weight.

By treating an aqueous medium containing suspended solid matter with a water-soluble polymer of monoallylamine, i.e., poly(monoallylamine) or poly(monoallylammonium) salt, whether modified or unmodified, coalescence of finely-divided solids is effected within the aqueous medium itself in a relatively short period of time. Thereupon it is an easy matter to physically separate the coalesced solids and the aqueous medium, for example by filtration, by centrifugation, or by settling followed by decantation.

These and other embodiments of the invention will be still further apparent from the ensuing description and appended claims.

As noted above, the polymers of monoallylamine used in the practice of this invention (whether modified or unmodified) are water soluble in the sense that no visible settling of a precipitate occurs from a solution of the polymer in water at 25° C. within one hour after the solution is formed. To the naked eye the polymers appear to dissolve in the water and form a true solution, although it is possible that stable colloidal suspensions or microgels may actually be formed at least in some cases. Irrespective of the physico-chemical mechanism or other niceties that may possibly be involved when the polymer is mixed with water, the important point is that the polymer does not settle out and for all practical purposes it behaves as if it is in solution.

Any water-soluble polymer of monoallylamine, i.e., poly(monoallylamine) or water-soluble poly(monoallylammonium) salt, whether a homopolymer or a copolymer or a crosslinked homopolymer or copolymer, that coagulates and/or flocculates suspended solids in an aqueous medium can be used in the practice of this invention. This includes poly(monoallylamine) itself and such polymeric salts as poly(monoallylammonium chloride) (also referred to as polyallylamine hydrochloride), poly(monoallylammonium bromide), poly(monoallylammonium bisulfate), poly(monoallylammonium sulfate), poly(monoallylammonium nitrate), poly(monoallylammonium dihydrogen phosphate), poly(monoallylammonium hydrogen phosphate), poly(monoallylammonium phosphate), poly(monoallylammonium formate), poly(monoallylammonium acetate), poly(monoallylammonium propionate), poly(monoallylammonium p-toluenesulfonate), and the like. In the case of some salts such as the sulfate and phosphate salts of polymers of monoallylamine it is desirable to employ polymers in which only a small proportion of the primary amino groups have been neutralized by sulfuric acid or the phosphoric acid inasmuch as the water solubility of the sulfate and phosphate polymers decreases with increasing sulfate or phosphate content. In fact, completely neutralized poly(monoallylamine) sulfate (poly)monoallylammonium sulfate)) and completely neutralized poly(monoallylamine) phosphate (poly(monoallylammonium phosphate)) tend to be essentially water insoluble. The preferred polymeric salts are the poly(monoallylammonium chlorides).

Water-soluble polymers of monoallylamine falling within a relatively wide range of molecular weights are suitable. For example, use may be made of water-soluble polymers in salt form (e.g., unmodified poly(monoallylammonium hydrochloride) having a weight average molecular weight (as determined by the equilbrium sedimentation method—see B. Vollmert, *Polymer Chemistry*, Springer-Verlag, New York, Copyright 1973, pp 361–369)—ranging upwards from about 1,000, and preferably ranging upwards from about 5,000. Water-soluble modified (e.g., suitably crosslinked) polymers in salt form with weight average molecular weights ranging up to about 500,000 or more are preferred, those falling in the range of about 10,000 to about 200,000 being particularly preferred. The weight average molecular weight (same test method) of the free (i.e., unneutralized) uncrosslinked poly(monoallylamines) ranges upwards from about 600, and preferably upwards from about 3,250. Water-soluble modified (e.g., suitably crosslinked) polymers in free (i.e., non-salt) form with weight average molecular weights ranging up to about 325,000 or more are preferred. Water-soluble polymers of monoallylamine having weight average molecular weights falling outside of the foregoing molecular weight ranges may also be used, provided of course that the suitability and efficacy are established, for example by performing a few tests.

Methods for the synthesis of water-soluble polymers of monoallylamine (homopolymers and copolymers, both free bases and salts thereof, and crosslinked or bridged polymers thereof) have been reported in the literature. See for example U.S. Pat. No. 4,504,640 granted Mar. 12, 1985, U.S. Pat. No. 4,528,347 granted July 9, 1985, European Patent Application No. 95,233 published Nov. 30, 1983, European Patent Application 131,306, published Jan. 16, 1985, and S. Harada and S. Hasegawa, *Macromolecular Chem., Rapid Communications*, 5, 27–31 (1984), all such disclosures being incorporated herein by reference. One currently recommended procedure involves hydrochlorination of allylamine followed by radial polymerization of the resulting allylamine hydrochloride. To convert the hydrochloride salt to the free polyallylamine (e.g., from which other water soluble salts can readily be produced) either of two different procedures is usually employed. One involves treatment of the polyallylamine hydrochloride solution with an alkali base such as sodium hydroxide to form an aqueous solution of the sodium chloride salt which is then subjected to dialysis and lyophilization. The other method utilizes a strong basic ion exchange resin for converting the polyallylamine hydrochloride solution into the polyallylamine solution which is then subjected to lyophilization to produce the free polymer. Various molecular weight grades of polyallylamine and of polyallylamine hydrochloride are presently available from Nitto Boseki Co., Ltd., Tokyo, Japan.

In preparing the crosslinked polymers of monoallylamine, use may be made of a variety of crosslinking agents. For example use may be made of alpha,beta-epoxy-gamma-haloalkanes, e.g., 3-chloro-1,2-epoxypropane, 3-bromo-1,2-epoxypropane, and 3-iodo-1,2-epoxypropane; and their higher homologs such as 3-chloro-1,2-epoxybutane, 3-bromo-1,2-epoxybutane, 3-iodo-1,2-epoxybutane, 3-chloro-1,2-epoxypentane, 3-chloro-1,2-epoxyhexane, 3-chloro-1,2-epoxyheptane, and the like. Likewise, dihaloalkanes may be employed for this purpose, a few typical examples being 1,2-dihaloethanes such as 1,2-dichloroethane (ethylene dichloride), 1,2-dibromoethane (ethylene dibromide), and 1-bromo-2-chloroethane; and their higher homologs such as 1,3-dichloropropane, 1,3-dibromopropane, 1,3-dichlorobutane, 1,4-dichlorobutane, 1,3-dibromobutane, 1,4-dibromobutane, 1,5-dichloropentane, 1,7-dichloro-4,4-dimethylheptane, and the like. Other cross-linking agents, such as dicarboxyl acid chlorides, mono or dialdehydes, and the like, known to those skilled in the art for crosslinking other polymeric materials, may also be used in effecting this crosslinking.

When producing crosslinked polymers of monoallylamine the amount of the crosslinking agent employed should be controlled so as to avoid the formation of water insoluble crosslinked products. Ordinarily the proportions used will fall in the range of about 50 to about 8,000 parts by weight of cross-linking agent per million parts by weight of the monoallylamine homopolymer or copolymer being subjected to crosslinking. Departures from this range are feasible, and may be found useful. Preferably, from about 250 to about 8,000 ppm of crosslinking agent is employed with poly(monoallylamine) having a weight average molecular weight in the range of about 5,000 to about 100,000, and from about 50 to about 250 ppm of crosslinking agent is employed with poly(monoallylamine) having a weight average molecular weight in the range of about 100,000 to about 350,000. In other words, it is desirable that the relative proportion of crosslinking agent to poly(monoallylamine) be inversely proportional to the weight average molecular weight of the poly(monoallylamine) being crosslinked.

The poly(monoallylamine) subjected to the crosslinking process may be preformed or it may be generated or formed in situ. Preferably the poly(monoallylamine) is formed by neutralizing or partially neutralizing a poly(monoallylammonium) salt such as:

poly(monoallylammonium chloride)—also referred to as polyallylamine hydrochloride
poly(monoallylammonium bromide)
poly(monoallylammonium bisulfate)
poly(monoallylammonium sulfate)
poly(monoallylammonium nitrate)
poly(monoallylammonium dihydrogen phosphate)
poly(monoallylammonium hydrogen phosphate) and
poly(monoallylammonium phosphate).

It is particularly desirable to form the poly(monoallylamine) in situ by rendering an aqueous medium containing one or more of these acid salts neutral or alkaline in pH by the addition of a suitably strong base such as sodium hydroxide, potassium hydroxide, or the like. The preferred polymers for this use are the poly(monoallylammonium chlorides).

Among the polymerizable comonomers that may be used in forming water-soluble monoallylamine copolymers are diallylamine hydrochloride, triallylamine hydrochloride, and the like. The copolymers should contain at least 95% by weight and preferably at least 98% by weight of monoallylamine with the balance being one or more such comonomers.

In practicing this invention the water-soluble polymer of monoallylamine is admixed in the aqueous suspension preferably with agitation. Heating is unnecessary as the coagulation and/or flocculation proceeds quite rapidly at ordinary ambient temperatures. Thus the temperature of the aqueous medium being treated will normally fall in the range of about 0° to about 35° C., and preferably between about 10° and about 25° C.

The amount of the water-soluble polymer of monoallylamine introduced into the aqueous medium being purified or treated will of course be governed to some extent by the amount of solids suspended therein. Thus the polymer is added to the suspension in an amount sufficient to coagulate/flocculate the suspended solids. In most cases, this will range from about 0.1 to about 100 parts per million parts by weight of aqueous suspension being treated, although variations from this range are feasible and may be utilized to suit the needs of the particular occasion. Ordinarily it is preferable to introduce a solids-coagulating or solids-flocculating quantity of the water-soluble polymer of monoallylamine as a freshly prepared preformed water solution as this facilitates mixing and insures rapid dispersal of the coguting/flocculating agent throughout the aqueous medium being treated. However it is also possible to introduce the polymeric coagulating/flocculating agents of this invention in solid form (e.g., as powder, granules, etc.) and when so doing, it is desirable to agitate or stir the system.

The pH of the aqueous system under treatment pursuant to this invention may vary within relatively wide limits. For best results, the pH of the system should fall in the range of about 5 to about 10. In instances where free poly(monoallylamine) or an aqueous solution thereof is introduced into an aqueous system that contains free acid (e.g., aqueous HCl) the corresponding poly(monoallylammonium) salt may be formed in situ in the aqueous system being treated and thus reduce the acidity of the system.

In order to demonstrate the efficacy of the process of this invention, tests were conducted using samples of water taken from the Mississippi River at Baton Rough, La. Individual samples of the river water were subjected to the tests within two hours after the overall sample was removed from the river. The individual test samples were taken from the river water sample while the latter was being stirred. In this way, the individual samples were as representative and as uniform in composition from sample to sample as possible. The test samples were placed in 500 mL beakers and while stirring these samples at 80–100 rpm measured quantities of freshly prepared aqueous solutions containing known quantities of polyallylamine hydrochloride produced by Nitto Boseki Co., Ltd. and having a weight average molecular weight of 60,000 were concurrently introduced into the series of samples by means of a pipet. A control sample was agitated in the same manner without the addition of any polyallylamine salt. Stirring of all samples was continued at 80–100 rpm for two minutes after the addition of the polyallylamine hydrochloride. Thereupon the speed of stirring was reduced to 30 rpm and continued at this rate for fifteen minutes and then stopped. After allowing all of the samples to stand in the quiescent state for fifteen minutes, samples of the supernatant liquids were withdrawn and analyzed for percentage of light transmittance by means of a spectrophotometer.

The results of these tests are summarized in Table I. The polyallylamine hydrochloride treating agent is therein abbreviated as PAA-HCl.

TABLE I

| Water Clarification Tests | | | | |
|---|---|---|---|---|
| | Ex. 1 | Ex. 2 | Ex. 3 | Control |
| Concentration of PAA—HCl, ppm* | 0.5 | 1.0 | 2.0 | none |
| % Light Transmittance | 65 | 89 | 96 | 40 |

*Parts by weight of polyallylamine hydrochloride per million parts by weight of the river water sample being treated.

To achieve the same water clarity with alum (probably the oldest coagulant standard in the industry) as achieved in Example 3, 50 ppm of alum was required.

A number of crosslinked water-soluble polymers of monoallylamine were produced as described in Examples 4–9.

EXAMPLE 4

A 33 weight percent solution of polyallylamine hydrochloride (Nitto Boseki Co., Ltd.) with a weight average molecular weight of 10,000 was prepared in a beaker using dimineralized water. Using sodium hydroxide pellets, the pH of the solution was adjusted to 8.5. Then, 3,500 ppm of epichlorohydrin based on the weight of the original poly(monoallylammonium chloride) was added to the solution and the beaker was immersed in a preheated oil bath. Crosslinking was carried out at 75° C. for 30 minutes. The resulting solution was then cooled to 25° C. The resulting crosslinked product had an initial Brookfield Viscosity of 275 cps and subsequently became considerably more viscous.

EXAMPLE 5

The procedure of Example 4 was repeated in the same way with the exception that the proportion of the epichlorohydrin used was 5,000 ppm based on the weight of the initial monoallylamine polymer. The crosslinked product was a non-Newtonian fluid.

EXAMPLE 6

Utilizing the same procedure as in Example 4, polyallylamine hydrochloride (Nitto Boseki Co., Ltd.) having a weight average molecular weight of 150,000 was crosslinked with epichlorohydrin in the amount of 150 ppm based on the weight of the original polyallyamine hydrochloride. The crosslinked product was a non-Newtonian fluid.

EXAMPLE 7

A 30 weight percent solution of polyallylamine hydrochloride (Nitto Boseki Co., Ltd.) with a weight average molecular weight of 10,000 was prepared in a beaker using demineralized water. The solution was 50% neutralized by adding sodium hydroxide pellets (22 wt %) which increased the pH to 9.1. After the NaOH dissolved, the solution was transferred to a round bottomed flask equipped with a reflux condenser, and 8,000 ppm of ethylene dichloride based on the weight of the original monoallylamine polymer was added to the solution. The mixture was heated with stirring at 80° to 90° C. and held at this temperature for 30 to 60 minutes. The resulting solution was then cooled to 25° C. The crosslinked product exhibited an initial Brookfield Viscosity of 160 cps.

EXAMPLE 8

The procedure of Example 7 was repeated in the same way with the exception that the proportion of the ethylene dichloride used was 10,000 ppm based on the weight of the original poly(monoallylammonium chloride). The crosslinked product gave an initial Brookfield Viscosity of 414 cps.

EXAMPLE 9

Utilizing the same procedure as in Example 7, polyallylamine hydrochloride (Nitto Boseki Co., Ltd.) having a weight average molecular weight of 150,000 was crosslinked with ethylene dichloride in the amount of 50 ppm based on the weight of the original monallylamine polymer.

Samples of water taken from the Mississippi River at Baton Rough, La. were treated with the crosslinked polymers of Examples 4–9 using the same general procedure as described above. More particularly, individual samples of the river water (used within two hours after removal from the river and sampled so as to be as representative and as uniform in composition from sample to sample as possible) were placed in 500 mL beakers and while stirring these samples 1 ppm of the respective crosslinked polymers of Examples 4, 5 and 6 above was introduced into the respective samples by means of a pipet. For comparative purposes, 1 ppm of a commercially available deflocculating agent for use in water clarification was added to another sample of the river water and subjected to the same test procedure.

All samples were stirred initially at 80 rpm for one minute and then at 30 rpm for one minuted. Thereupon the stirring was stopped and the systems were allowed to stand in the quiescent state for a period of fifteen minutes. Visual observations were made of the flocculation, settling, clarity, sludge, and floating material in each of the respective samples. For this purpose a rating scale of 0 to 10 was used, 0 representing 100% efficiency. In addition, samples of the supernatant liquids were withdrawn and analyzed for percentage of light transmittance by means of a spectrophotometer.

The results of these tests are summarized in Table II.

TABLE II

| Water Clarification Tests | | | | |
|---|---|---|---|---|
| | Crosslinked Poly (allylamine) | | | Commercial |
| | Ex. 4 | Ex. 5 | Ex. 6 | Additive |
| Flocculation | 1 | 1 | 1 | 1 |
| Settling | 1 | 1 | 1 | 1 |
| Clarity | 3 | 3 | 3 | 2 |
| Sludge | 2 | 2 | 2 | 1 |
| Floating | 0 | 0 | 0 | 0 |
| % Light Transmittance* | 57 | 55 | 55 | 74 |

*The transmittance of the untreated water was zero.

Another group of tests were conducted in the same manner using the crosslinked products of Examples 7, 8, and 9. A commercially-available flocculant and a sample of polyallylamine hydrochloride ("PAA-HCl") is received from Nitto Boseki Co. Ltd., (weight average molecular weight, 150,000) were individually tested as well. The results, in which all materials tested were employed at a concentration of 2 ppm of the river water, are summarized in Table III.

TABLE III

| Water Clarification Tests | | | | |
|---|---|---|---|---|
| | Crosslinked Poly(allylamine) | | | Commercial |
| | Ex. 7 | Ex. 8 | Ex. 9 | PAA—HCl | Additive |
| % Light Transmittance* | 89 | 91 | 91 | 92 | 85 |

*The transmittance of the untreated water was 30%.

In the practice of this invention use may be made of mixtures of different water-soluble polymers of monoallylamine of the type referred to hereinabove. Similarly, one or more such polymers of monoallylamine may be used in combination with previously known coagulants or flocculants, provided of course that each previously known coagulating or flocculating agent so used is chemically compatible with and does not impair the effectiveness of the coagulating agent(s) of this invention with which it is used.

According to theory, there is a difference between a coagulating agent and a flocculating agent, mainly in the mechanism by which the material functions. For the purposes of this invention such a fine line of distinction is unimportant and of no moment since the polymeric agents used in this invention function to coalesce—i.e., bring together—the suspended solids so that they can be easily removed from the aqueous medium. Thus this invention is not limited to any mechanism by which the polymeric treating agents actually work—the mechanism is immaterial, and may involve coagulation or flocculation, or both, or perhaps neither. The important thing is: they work.

This invention is susceptible to considerable variation in its practice within the spirit and scope of the appended claims.

What is claimed is:

1. A process of removing solids from aqueous suspension which comprises admixing with the suspension a water-soluble polymer of monoallylamine in which some or all of the pendant-$CH_2NH_2$ groups are neutralized with an acid and are in salt form, so that coalescence of solids is effected.

2. A process of claim 1 in which the water-soluble substance used is poly(monoallylammonium chloride).

3. A process of claim 1 in which the water-soluble substance used is poly(monoallylammonium chloride) crosslinked by means of ethylene dichloride.

4. A process of claim 1 in which the water-soluble substance used is a crosslinked homopolymer.

5. A process of claim 1 in which the water-soluble substance used is a crosslinked copolymer.

6. A process of claim 1 in which the water-soluble substance used is a crosslinked polymer wherein the crosslinking is effected by means of a dihaloalkane having two halogen atoms reactable with the amino groups.

7. A process of claim 1 in which the water-soluble polymer used has a weight average molecular weight above 1,000.

8. A process of claim 1 in which the water-soluble substance used is represented by the formula:

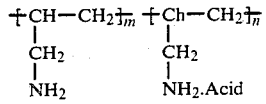

where m is a number from zero to about 100,000 and n is a number from zero to about 100,000, the sum of m plus n being in the range of about 10 to about 100,000.

9. A process of claim 8 in which the water-soluble substance used is a crosslinked polymer.

10. A process of coagulating solid matter suspended in an aqueous medium which comprises treating the aqueous medium with a water-soluble polymer of monoallylamine in which some or all of the pendant-$CH_2NH_2$ groups are neutralized with an acid and are in salt form, so that coalescence of solids is effected within the aqueous medium.

11. A process of claim 10 in which the water-soluble substance used is poly(monoallylammonium chloride).

12. A process of claim 10 in which the water-soluble substance used is poly(monoallylammonium chloride) crosslinked by means of ethylene dichloride.

13. A process of claim 10 in which the water-soluble substance used is a crosslinked homopolymer.

14. A process of claim 10 in which the water-soluble substance used is a crosslinked copolymer.

15. A process of claim 10 in which the water-soluble substance used is a crosslinked polymer wherein the crosslinking is effected by means of a dihaloalkane having two halogen atoms reactable with the amino groups.

16. A process of claim 10 in which the water-soluble polymer used has a weight average molecular weight above 1,000.

17. A process of claim 10 in which the water-soluble substance used is represented by the formula:

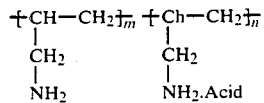

where m is a numbrer from zero to about 100,000 and n is a number from zero to about 100,000, the sum of m plus n being in the range of about 10 to about 100,000.

18. A process of claim 17 in which said water-soluble substance used is crosslinked with a crosslinking agent having two or more groups reactable with the amino group.

19. A process of removing solid matter from an aqueous medium containing suspended particulate matter which comprises intermixing with the aqueous medium a water-soluble polymer of monoallylamine in which some or all of the pendant-CH$_2$NH$_2$ groups are neutralized with an acid and are in salt form, to cause coalescence of particulate matter in the aqueous medium, and physically separating the aqueous medium and the resultant solid matter.

20. A process of claim 19 in which the water-soluble substance used is represented by the formula:

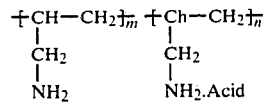

where m is a number from zero to about 100,000 and n is a number from zero to about 100,000, the sum of m plus n being in the range of about 10 to about 100,000.

21. A process of claim 20 in which said water-soluble substance used is crosslinked with a crosslinking agent having two or more groups reactable with the amino group.

22. A process of removing solids from aqueous suspension which comprises admixing with the suspension a water-soluble crosslinked polymer of monoallylamine in which some or all of the pendant-CH$_2$NH$_2$ groups are neutralized with an acid and are in the salt form, so that coagulation of solids is effected.

23. A process of claim 22 further comprising physically separating the aqueous medium and the coagulated solid matter.

* * * * *